H. G. SEDGWICK.
RAILWAY CAB SIGNALING SYSTEM.
APPLICATION FILED JULY 29, 1911. RENEWED MAY 10, 1917.
1,230,042.
Patented June 12, 1917.
9 SHEETS—SHEET 3.
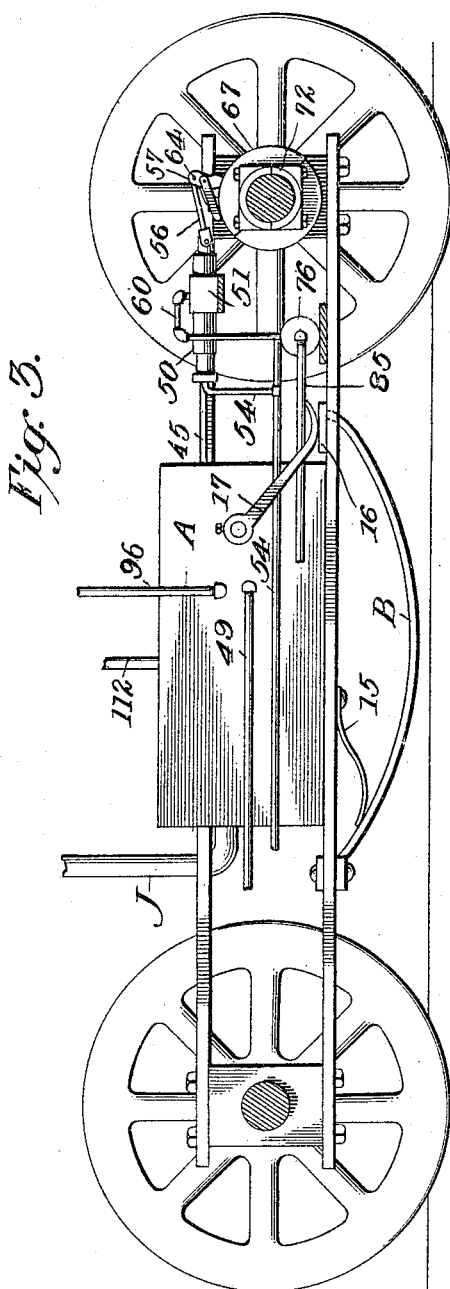
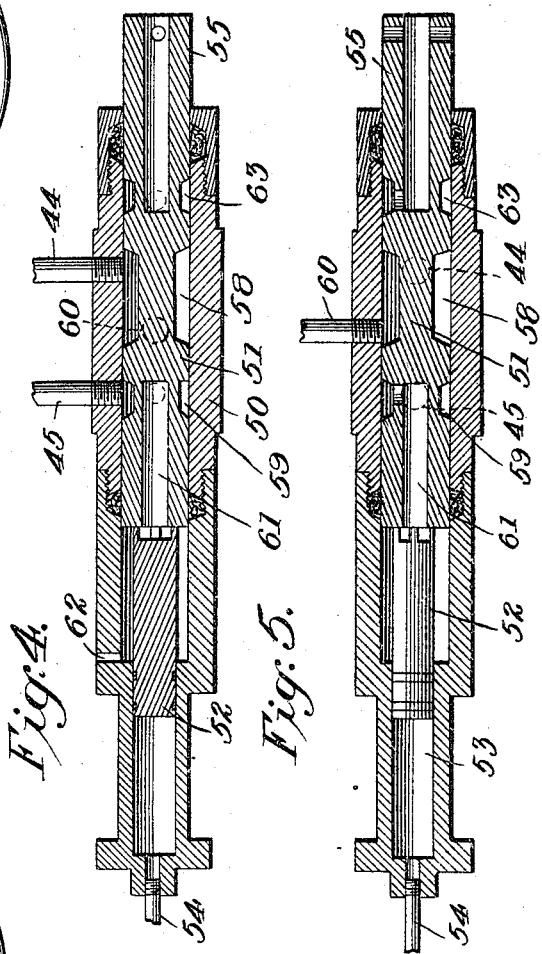

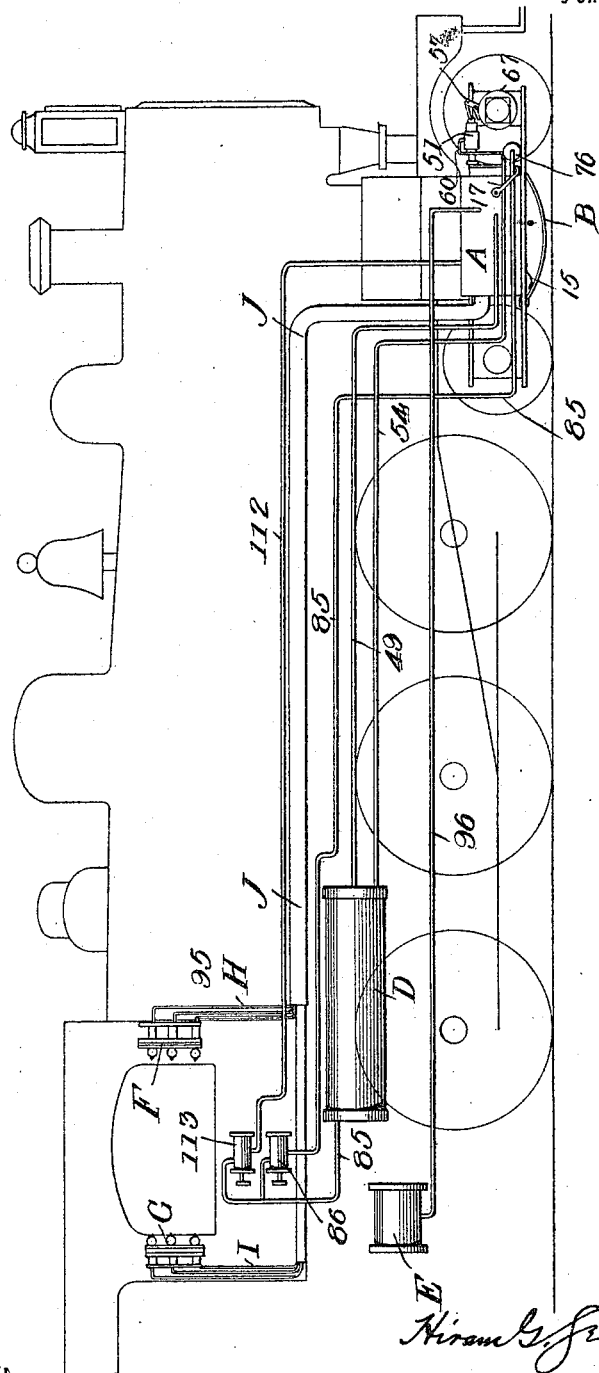

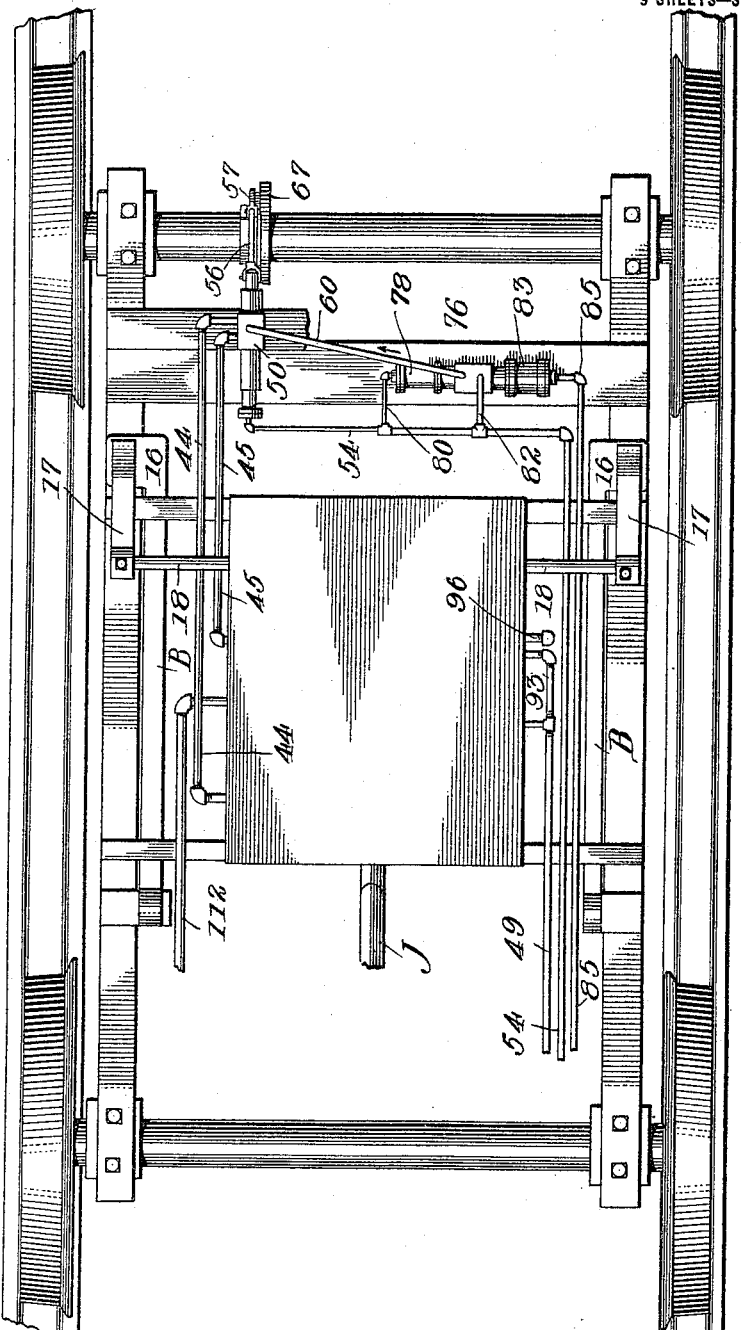

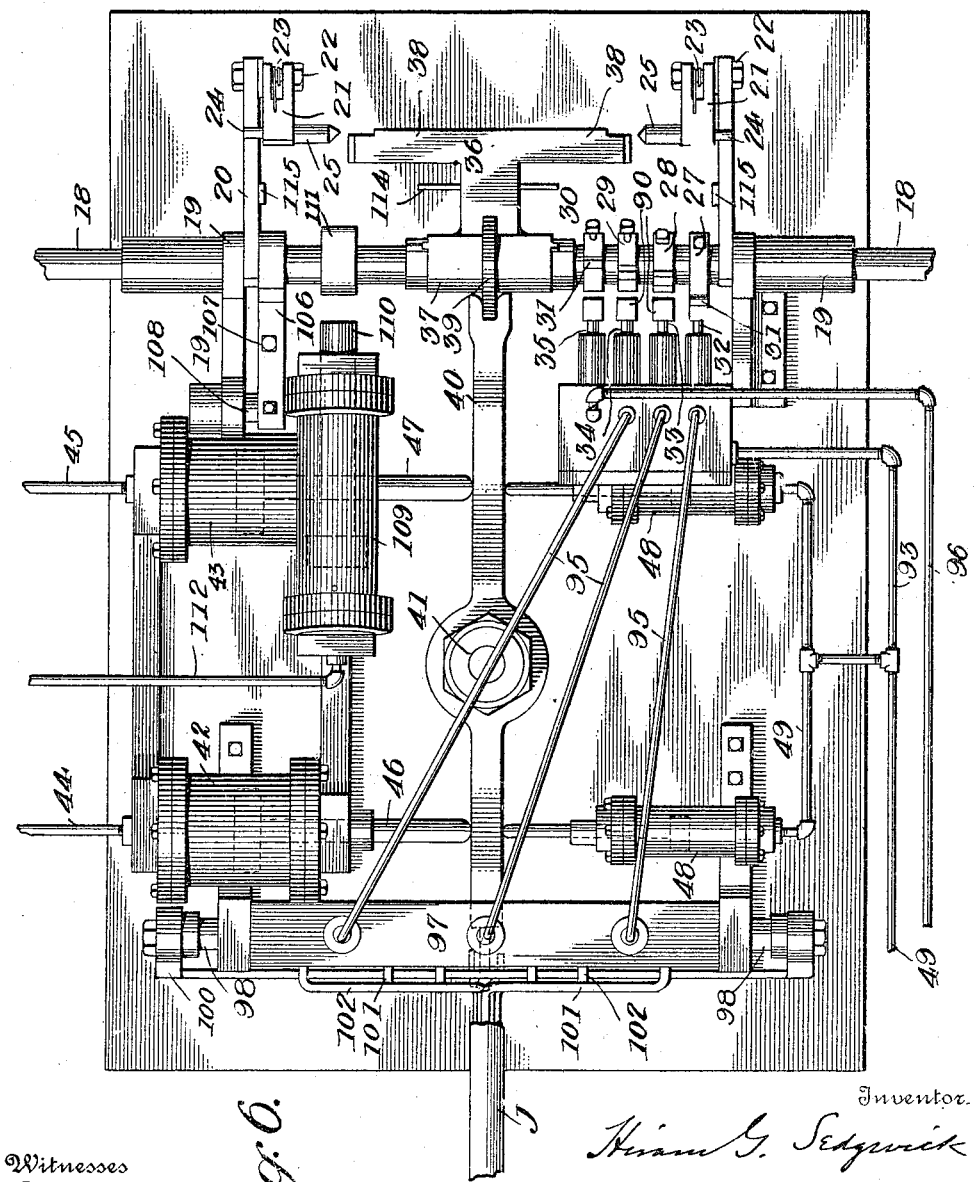

H. G. SEDGWICK.
RAILWAY CAB SIGNALING SYSTEM.
APPLICATION FILED JULY 29, 1911. RENEWED MAY 10, 1917.
1,230,042.
Patented June 12, 1917.
9 SHEETS—SHEET 5.
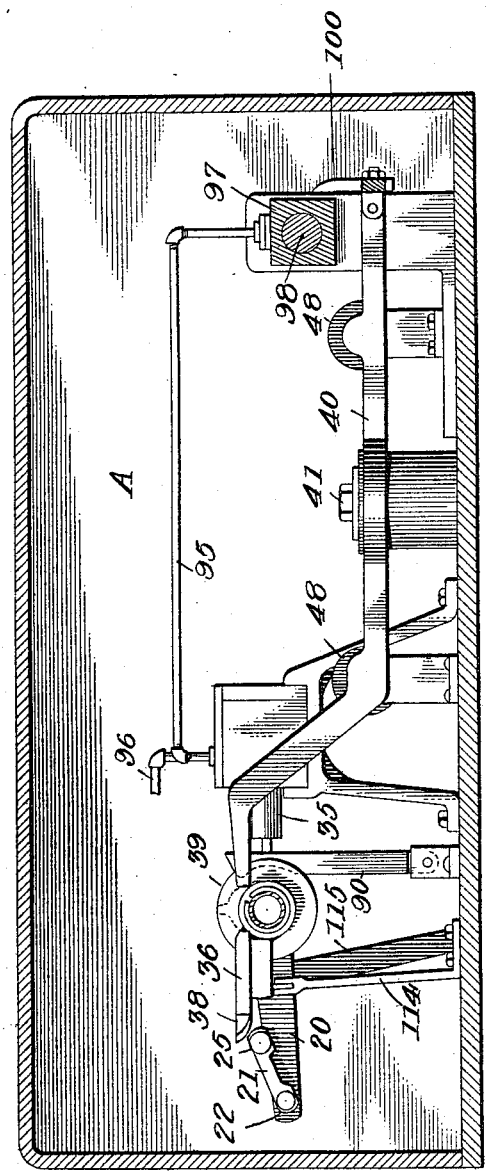
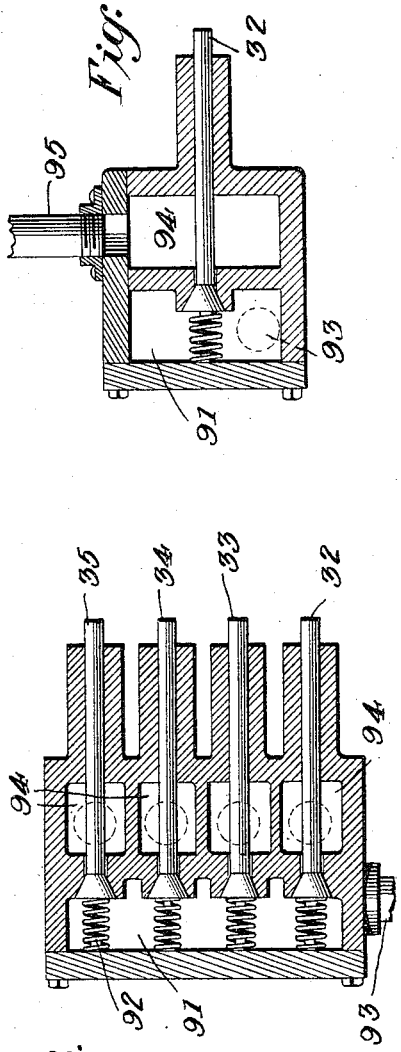

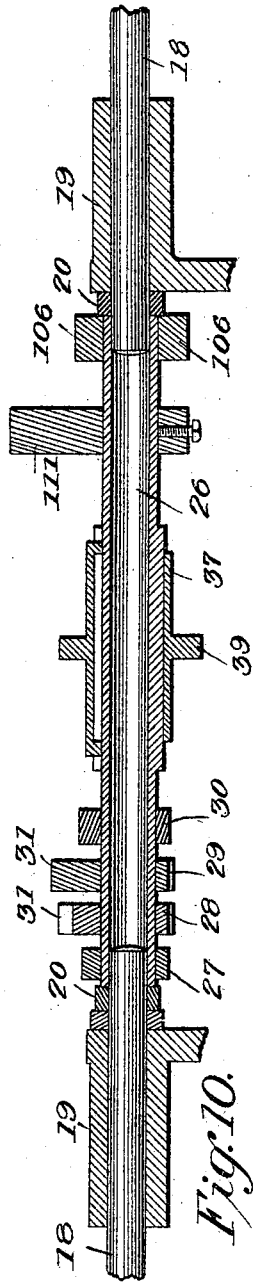
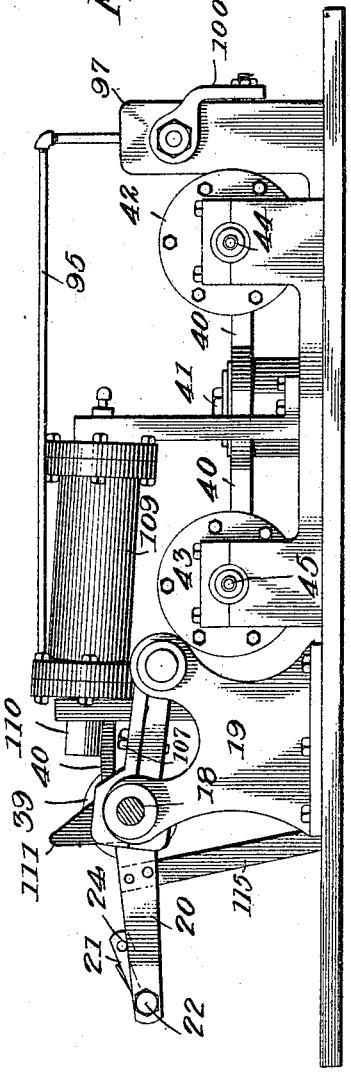
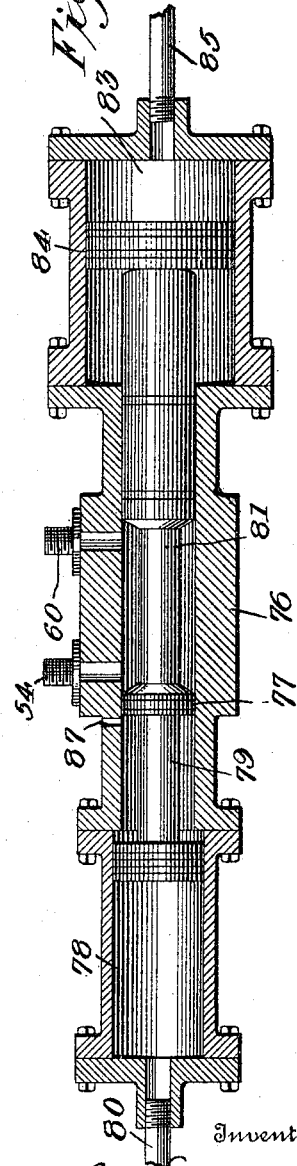

H. G. SEDGWICK.
RAILWAY CAB SIGNALING SYSTEM.
APPLICATION FILED JULY 29, 1911. RENEWED MAY 10, 1917.

1,230,042.

Patented June 12, 1917.
9 SHEETS—SHEET 7.

Witnesses

Inventor
Hiram G. Sedgwick
By Davis & Davis
Attorneys

H. G. SEDGWICK.
RAILWAY CAB SIGNALING SYSTEM.
APPLICATION FILED JULY 29, 1911. RENEWED MAY 10, 1917.

1,230,042.

Patented June 12, 1917.
9 SHEETS—SHEET 8.

Witnesses
Jos H Collins
M Bridges

Inventor
H. G. Sedgwick
By Davis & Davis
Attorneys

H. G. SEDGWICK.
RAILWAY CAB SIGNALING SYSTEM.
APPLICATION FILED JULY 29, 1911. RENEWED MAY 10, 1917.

1,230,042.

Patented June 12, 1917.
9 SHEETS—SHEET 9.

Witnesses

Inventor
Hiram G. Sedgwick
By Davis & Davis
Attorneys

UNITED STATES PATENT OFFICE.

HIRAM G. SEDGWICK, OF MILL VALLEY, CALIFORNIA, ASSIGNOR TO THE NATIONAL SAFETY APPLIANCE COMPANY, A CORPORATION OF CALIFORNIA.

RAILWAY-CAB SIGNALING SYSTEM.

1,230,042.  Specification of Letters Patent.  Patented June 12, 1917.

Application filed July 29, 1911, Serial No. 641,287. Renewed May 10, 1917. Serial No. 167,801.

*To all whom it may concern:*

Be it known that I, HIRAM G. SEDGWICK, a citizen of the United States of America, and a resident of Mill Valley, county of Marin, and State of California, have invented certain new and useful Improvements in Railway-Cab Signaling Systems, of which the following is a full and clear specification, reference being had to the accompanying drawings, in which—

Figure 13:
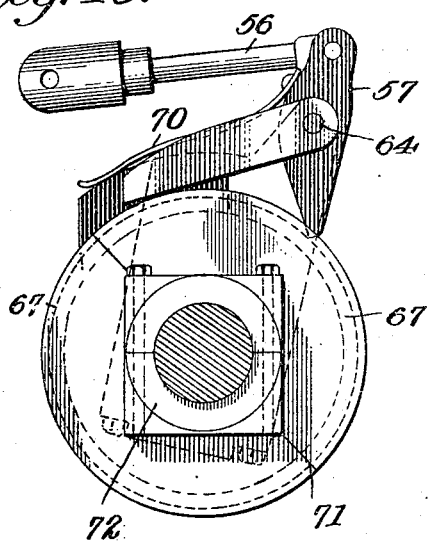
Figure 14:
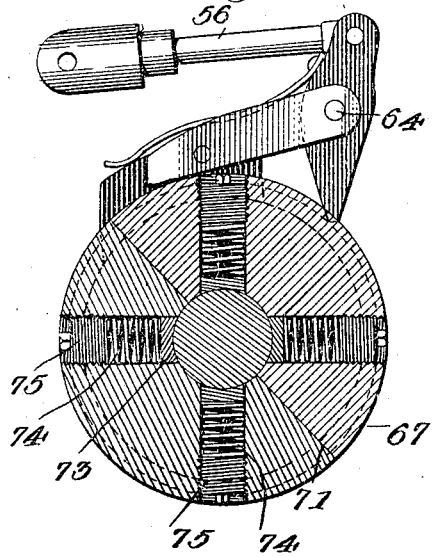
Figure 15:
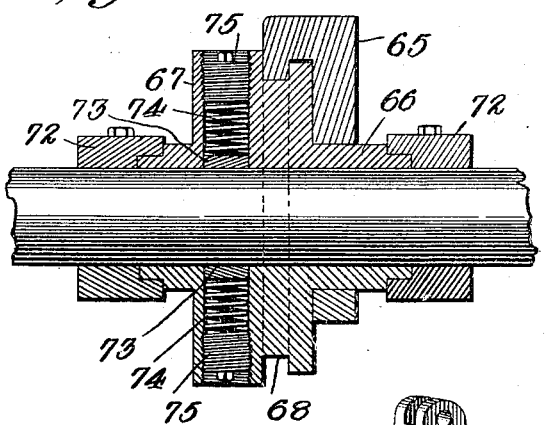
Figure 16:
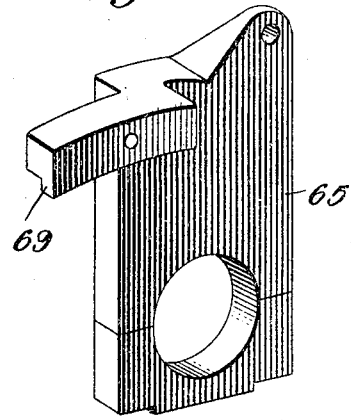
Figure 17:
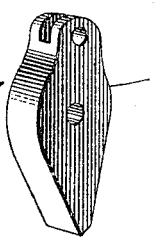
Figure 18:
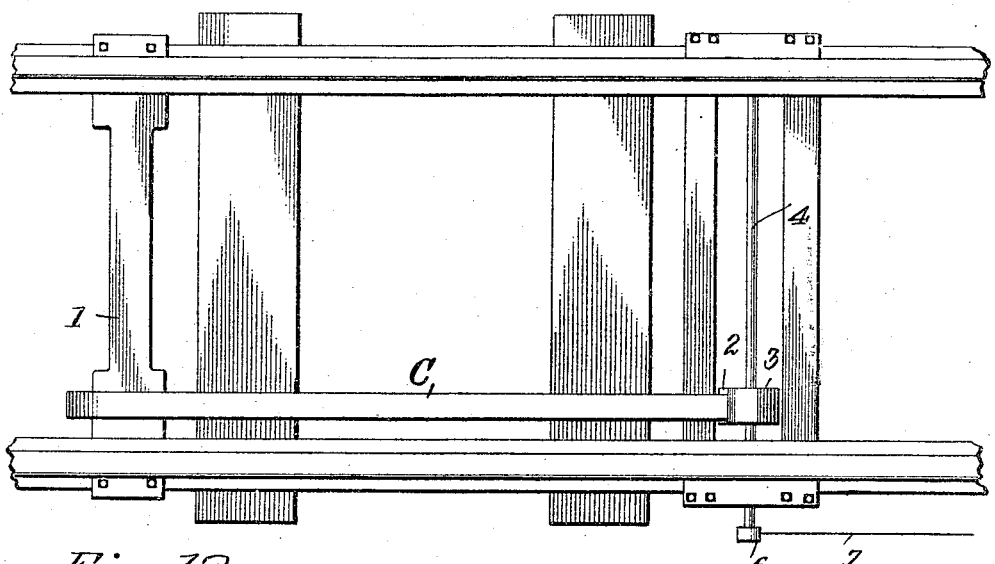
Figure 19:
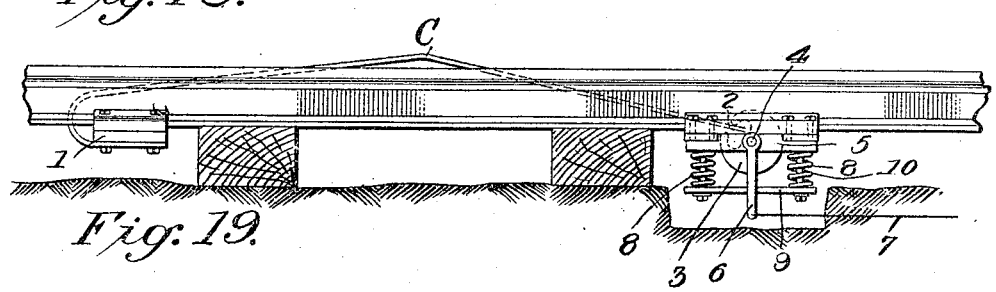
Figure 20:
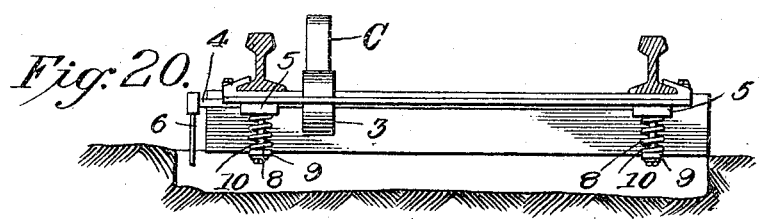
Figure 21:
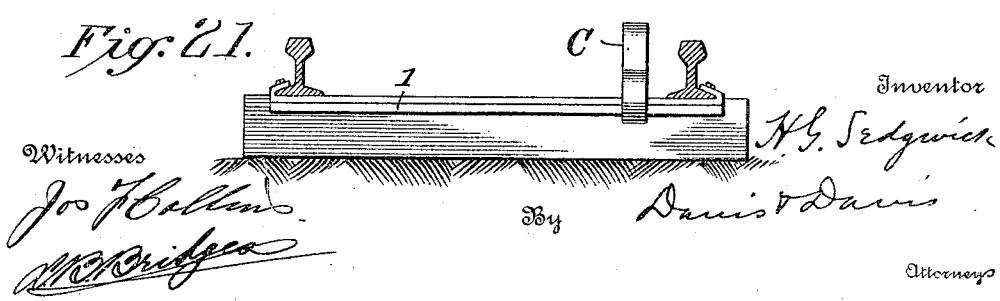
Figure 22:
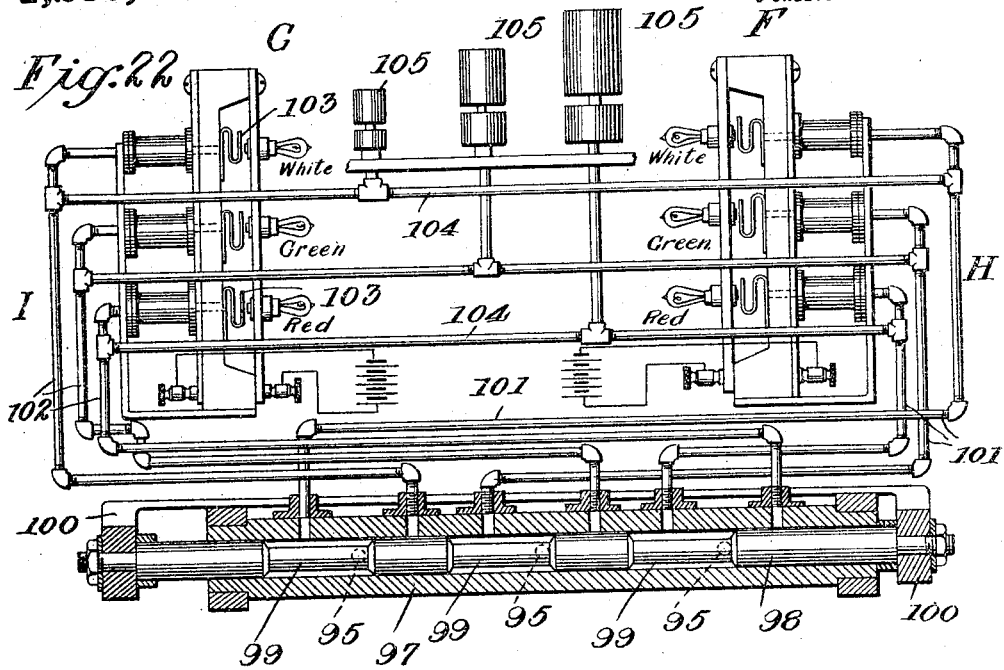
Figure 23:
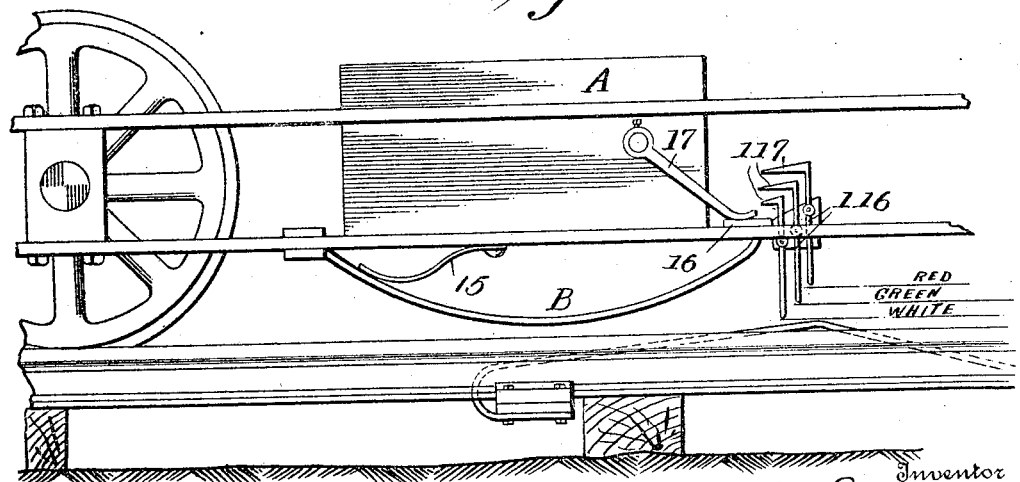

Figure 1 is a diagram of a locomotive showing my invention applied thereto, the pneumatic embodiment of the invention being illustrated in this instance;

Fig. 2 a plan view of the truck of a railway vehicle carrying parts of my invention;

Fig. 3 a side elevation of the same;

Fig. 4 a longitudinal sectional view of the reversing valve;

Fig. 5 a similar view of the same valve taken through a different plane;

Fig. 6 a plan view of valve operating mechanism, showing the reversing mechanism in the act of reversing;

Fig. 7 a vertical longitudinal view of the same;

Fig. 8 a horizontal sectional view taken through the signal valves;

Fig. 9 a vertical sectional view through the same;

Fig. 10 a vertical longitudinal section taken through the cam shaft;

Fig. 11 a side elevation of the mechanism shown in Fig. 6;

Fig. 12 a vertical sectional view of the cut-off valve;

Fig. 13 a side elevation of the device for automatically actuating the reversing valve;

Fig. 14 a vertical transverse sectional view of the same;

Fig. 15 a vertical longitudinal sectional view of the same;

Figs. 16 and 17 detail perspective views of parts of the same;

Fig. 18 a plan view of a portion of a road bed showing one of the road bed shoes;

Fig. 19 a side elevation thereof;

Fig. 20 a vertical sectional view thereof;

Fig. 21 a similar view taken at a different point;

Fig. 22 a view partly in section and partly in side elevation of the signal devices;

Fig. 23 a detail side elevation of the vehicle shoe.

The object of this invention is to provide simple and reliable mechanism for transmitting from the road bed to the cab a series of visual or audible signals which shall convey to the engineer information as to the presence of a danger ahead and the nature of said danger, the construction of the parts being designed to render the system as nearly infallible as it is possible with mechanical devices, as more fully hereinafter set forth.

Referring generally to the diagram shown in Fig. 1 A designates a box or casing in which the main valve mechanism is housed, this casing being preferably mounted in a position low down on the locomotive truck; B the shoes on the locomotive for operating said valve mechanism, these shoes being adapted to be pushed upwardly by contact with a suitable shoe (such as shoe C shown in Figs. 18 to 21); D an air storage reservoir on the locomotive which may be a specially provided tank or the usual brake reservoir; E a suitable valve for automatically applying the train brakes; F a system or series of signal lamps mounted in the front part of the cab where they will be in front of the engineer while he is going and looking forwardly, and G a similar series or system of lamps arranged at the rear of the cab where they will be plainly visible to the engineer when he is going and looking backwardly; H a set of pipes leading to the front lamps F and I a set of pipes leading to the rear lamps G, these pipes being preferably inclosed in a suitable cable or tube J by which they are protected on their way from the casing A to the cab.

The two shoes B are arranged one at one side of the locomotive and the other at the other side thereof, and the road bed shoes C are as usual to be fixed on the road bed along both sides thereof in line with said shoes B, so that one series of shoes on the road bed will operate the right hand shoe B on the locomotive when going forward and the other set of road bed shoes will operate the other shoe B when backing. The shoes C are adapted to be raised and lowered to different heights so that they shall raise the shoe B to correspondingly different heights. Any suitable means may be employed for raising and lowering the shoe C and holding it in its adjusted position. I prefer constructing the shoe C of an upwardly bowed or bent spring affixed rigidly at one end to a bar 1 rigidly clipped to the rails. The normal tendency of the spring is to fly upwardly, and its free end extends into a radial notch or recess 2 in a cam 3 affixed to a shaft 4 journaled in bearings 5 mounted under the rails. The shaft 4 may be rotated by any suitable means to raise and lower the spring shoe C; I have shown the shaft provided with an arm 6 to which is connected an operating wire 7, which wire in turn may be connected to the usual semaphore mechanism so that the shoe C will be set simultaneously with the semaphore. The bearing plates 5 are preferably supported on springs 8 which assist in cushioning the blow received by the spring shoe, said springs 8 being supported on bars 9 which are hung on suitable depending bolts 10.

Shoes B are normally pressed downwardly by suitable springs 15, their downward movement being limited by a lateral ear or lug 16 carried at the free end of each of said shoes and adapted to rest upon one of the frame bars of the truck. Bearing upon the free end of each of these shoes is an arm 17 carried at the end of a shaft 18. These two shafts 18 enter the casing A at opposite sides thereof and within the casing they are respectively journaled in bearings 19. On the inner end of each of the shafts 18 is affixed a radial arm 20, carrying at its outer end a trip 21 which trip is connected to the arm by a horizontal pivot 22 and is caused to tend to swing downwardly by means of a spring 23, this downward swing of the trip being limited by a pin 24 which normally bears upon the upper surface of the arm 20. Each of these trips is provided with a pin 25, these pins lying parallel with the shafts 18 and extending toward each other. The shafts 18 are in axial alinement, and journaled on their inner ends is a tubular cam shaft 26, this shaft 26 being rotatable independently of the shafts 18. At one end of this shaft 26 is mounted a series of cams 27, 28, 29 and 30, each of which cams is provided with a radial shoulder 31, and the cams are set on the shaft in such position that these radial shoulders shall have a stepped relation circumferentially of the shaft, each shoulder, beginning with cam 28, being set a little back of the shoulder of the preceding cam. When the shaft 26 is rotated, these cam shoulders 31 are caused to progressively actuate the stems of a series of corresponding valves 32, 33, 34 and 35, which system of valves is adapted to distribute fluid pressure to the various signals and train stopping means in a manner hereinafter described.

The shaft 26 is rotated in one direction by means of the shafts 18 and their radial arms and trips, through the medium of a tappet 36 extending radially from a sleeve 37 and having lateral extensions 38 adapted to be shifted into the path of either one of the trip pins 25, said sleeve 37 being slidably mounted on the shaft 26 and being prevented from rotating thereon by a suitable feather connection therewith. This sleeve 37 is shifted back and forth on the shaft by any suitable means. The distance between the ends of the tappet arms 38 is less than the distance between the ends of the pins 25 so that under no circumstances can the tappet be in a position to be lifted by both pins. When shifted to the right side the tappet is in position to be lifted by the right hand pin 25, and vice versa.

I provide automatic means for shifting the reversing tappet when the direction of the movement of the locomotive is changed so that the apparatus will be automatically adjusted to coöperate with either the road bed shoes at one side of the track or the series of shoes at the other side of the track. This automatic means for shifting the tappet consists of the following instrumentalities: The sleeve 37 is provided with an annular collar 39, and in engagement with this collar is the forked end of a lever 40 pivoted on a vertical bolt 41 mid-way its ends. Mounted at one side of this lever is a pair of air cylinders 42, 43 which are supplied with air through pipes 44 and 45. These cylinders are arranged at opposite sides of the pivot 41 so that their piston rods 46 and 47 may bear upon the same side of the lever 40 but at opposite sides of the pivot 41, so that said lever may be swung in one direction by introducing air into one of the cylinders and letting it out of the other and in the other direction by reversing the course of the air. At the opposite side of the lever 40 is mounted another pair of cylinders 48 in opposed relation these cylinders having their outer ends connected by piping 49 with the air reservoir D, so that a constant pressure is exerted on the pistons in these cylinders and the rods of these pistons are thus caused to constantly bear against the side of the lever 40 opposite the piston rods 46 and 47, thus tending to hold said lever 40 normally against the piston rod 46 or 47, whichever one happens to be in action. The cylinders 48 are smaller in diameter than the opposing cylinders 42 and 43 so that the pressure in the latter cylinders will dominate the power exerted by the smaller cylinders 48. The cylinders 48 therefore simply act in the nature of pneumatic springs or cushions.

The two pipes 44 and 45 enter the casing of the reversing valve 50 mounted on a suitable part of the truck just back of one of the axles thereof. This valve embodies a cylindrical casing and a reciprocating tubular valve 51 therein which is normally pressed to the forward limit of its movement by means of a small piston 52 working in a cylinder 53 connected by a pipe 54 to the reservoir D. The tubular stem portion 55 of the valve 51 projects forwardly from the forward end of the casing and is pivotally connected by the short rods 56 to the upper end of the friction pawl 57.

The valve 51 is provided with a wide annular port 58 and also with a narrower port 59. These ports are so proportioned and spaced that when the valve is in its normal forward position as shown in Figs. 4 and 5 the narrow port 59 is in communication with pipe 45 and the wide port 58 is in communication with pipe 44, and said wide port is also in communication with another pipe 60 which enters the valve casing at a point between the two pipes 44 and 45 and is connected to a source of air pressure in the manner hereinafter described, so that when the valve is in its forward position air under pressure is let into pipe 44 so that the rear end of the lever 40 shall be pushed over to one side and thus shift the tappet in the opposite direction until one end 38 lies over one of the trip pins 25. In this position the other pipe 45 is in communication with the atmosphere through port 59, longitudinal port 61 in the valve and port 62 in the valve casing, so that the piston in the cylinder 43 is inactive.

By forcing the valve 51 back against the pressure in cylinder 53, the supply of air to pipe 44 is cut off and put into communication with the pipe 45, which action will throw the air pressure into cylinder 43 and thus shift the lever 40 over to the opposite side. When this takes place the cylinder 42 will be relieved of its air pressure through pipe 44 and another annular port 63 formed in the valve 51 which port has by the backward movement of the valve been brought in alinement with pipe 44. From port 63 the air escapes out through the tubular valve stem 55. This reversal takes place automatically when the engine is backed by reason of the following devices: The pawl 57 is pivoted mid-way its length on a pivot 64 which is supported in an arm 65 pivotally mounted on the hub 66 of a friction disk or drum 67 mounted on the axle. The depending end of the pawl frictionally bears in an annular channel 68 in the friction drum, and to hold the lever 65 close to the side of the drum said lever is provided with a lug 69 which extends over into the channel 68. A spring 70 may be employed to keep the parts from rattling and to tend to hold the pawl in its normal position with its point against the friction disk or drum. The friction drum is divided diametrically on the line 71 and these parts are held together and against end-wise movement on the axle by means of suitable divided collars 72 clamped on the axle. The degree of friction with which the drum is held on the axle is regulated by means of a series of friction blocks 73 kept normally pressed against the axle by means of springs 74 whose tension may be varied by means of screw plug 75. The construction of this device enables it to be applied to any axle and at any point along the same.

It will be observed that while the axle is rotating forwardly, no action takes place, since the pawl is free to swing in the direction of rotation. When however the locomotive backs and the axle is thus rotated backwardly, the pawl bites into the surface of the friction drum and is thereby moved bodily, together with its supporting arm 65 backwardly, thereby shifting the valve 51 to its rearward position against the action of its piston 52. When the valve has thus been shifted and there is then a materially greater resistance to its further movement backwardly, the axle will rotate independently of the friction drum and will so continue to rotate while the engine is backing. As is obvious the valve will be held in this rearward position during the whole time the engine is backing, but as soon as the engine starts forward again the pawl will be released and the cylinder 53 will again return the valve to its normal forward position. This mechanism provides an extremely simple and effective means for effecting an immediate reversal of the mechanism on the locomotive to adapt it for receiving signals from the left hand side of the road. It will be understood of course that no signals can be transmitted to the cab except through the tappet 36, so that the position of this tappet always determines from which side of the road bed the signals can be taken, and it will also be understood that at the side which is out of action the operations of the trip arm 20 will be idle should their shoes come in contact with any road bed shoes which are set for action.

The pipe 60 enters the casing of a valve 76 which contains a reciprocating valve 77 which is kept normally pressed in one direction by a cylinder 78 and a piston 79, this cylinder 78 being connected by a pipe 80 to the reservoir pipe 54, and when thus forced to one side a wide annular port 81 formed in the valve puts pipe 60 in communication with a pipe 82 which pipe 82 is also connected with reservoir pipe 54. In this position therefore the reservoir pressure is admitted to pipe 60. This is the normal position of the parts, and this position is only changed where the engineer desires to entirely cut off reservoir air from pipe 60 and thus put out of action temporarily the signal transmitting mechanism, this being done only when the engineer desires to run past a danger point. To thus shift valve 79, I provide a cylinder 83 at the end of the valve opposite the cylinder 78, and in this cylinder 83 is mounted a piston 84 which is in abutting relation with the stem of valve 77. This cylinder 83 is larger than the cylinder 78 so that when air is let into it the pressure will overcome the opposing pressure in cylinder 78 and thus shift the valve against the pressure cylinder 78. Air is supplied to cylinder 83 by pipe 85 connected to the reservoir D, this pipe 85 being provided with a suitable valve 86, within convenient reach of the engineer, whereby the engineer can at will permit air to enter said cylinder 83.

When air is thus cut off entirely from the reversing valve 51 the pipe 60 is put into communication with casing port 87, in casing 76, through port 81, thus permitting air pressure in pipe 44 and its cylinder 42 to be exhausted to the atmosphere. This renders both cylinders 42 and 43 idle and permits the two cylinders 48 to entirely control the action of the reversing lever 40, and these two cylinders being equal in size and being equally spaced from the pivot 41 of the reversing lever, the reversing lever will be shifted to central or neutral position, as shown in Fig. 6, in which position both the trip arms are out of action, so that the signaling devices and the train stopping means, if the latter be employed, are rendered temporarily inoperative. As only extraordinary conditions would give an engineer a license to thus pass a danger signal, it is contemplated that a suitable device shall be used in conjunction with the permissive valve 86 to record the number of times that valve is operated, to thus keep a check on the engineer.

Referring to the distributing valves 32, etc., it will be seen that these valves are operated by the cams 27, etc., not directly but through the medium of a series of shoes or levers 90 pivotally mounted on the base. These valves are mounted in a valve casing embodying an inlet chamber 91 in which the valves being held to their valves seats by means of springs 92, said inlet chamber being connected to the reservoir pressure by means of a pipe 93. Each valve normally closes a port 94 leading to a series of pipes three of which are designated 95 and the remaining one of which is designated 96. The pipe 96 extends to the brake system vent valve E, while the other three pipes 95 extend to a long valve casing 97 which they enter at different points along the same. Reciprocably mounted in the cylindrical casing 97 is a valve 98 provided at intervals with three wide annular ports 99, these ports being so proportioned and spaced that in all positions of the valve one of these ports will be in constant communication with one of the pipes 95.

The valve 98 is connected to the shifting lever 40 by means of a yoke 100, so that the valve will be shifted simultaneously with the reversing lever. In one position of the valve, the pipes 95 are kept respectively in communication with a set of pipes 101 which pipes lead to the respective lamps of the front set of lamps F; and in the other position of the valve 98 this set of pipes 101 is cut off entirely from communication with pipes 95 and another set of pipes 102 are in free communication with said pipes 95, this latter set of tubes running respectively to the rear series of lights G. Any suitable means may be employed to convert the air pressure sent up through pipes 101 or 102 into light signals. I have shown electric lights with a spring switch 103 at each lamp, this switch or circuit closer being adapted to be actuated by the jet of air sent up through the pipe, over whose exit the switch or closer is mounted. In addition to the light signals the corresponding pipes of the two sets may be connected by pipes 104, and connected with each one of these pipes 104 may be an audible signal such as a whistle 105, these several whistles being of different size or character so that by sound alone they will differentiate the various signals. Each series of lamps will of course be differently colored in order that a series of different signals may be indicated. By arranging one set of lamp signals in the front part of the cab and a duplicate set in the rear thereof, it will be seen that no matter in which direction the train may be going the engineer will have immediately in front of him a complete set of signals, thus contributing greatly to safety of the train.

I have shown the electric lamps as signals but it will be understood that any other visual signals may be employed.

It will be observed that the degree of elevation of the road bed shoe will determine the character of the signal transmitted to the cab. If the road bed shoe be set say one inch above its inoperative position, it will raise the vehicle shoe B sufficient to operate the first valve 32 through its complementary cam 27. When this first valve 32 is opened an air impulse is sent up through one of the pipes 95, thence through one of the pipes 101 or 102, depending on which set of pipes happens for the time being to be in operative connection with the pipes 95, whereupon one of the lamps either at the front or the back will be lighted. As this adjustment of the road bed shoe will ordinarily be a safety adjustment, this adjustment will be arranged to light the white light in either the front set or the back set according to which way the train is going. Should the road bed shoe be set a little higher, it will raise the vehicle shoe sufficiently to operate also the valve 33, whereupon the second or green light will be also operated. A still further adjustment will light the remaining or red lamp, and a still higher adjustment will in the same manner send an impulse up through pipe 96 and thus supply the brake automatically. With each of these operations except the last one, one or more of the audible signals will also be operated.

When the shaft 26 is thus rotated to bring its cams into action it is essential that it shall temporarily remain in the position to which it is adjusted until it is returned to normal by the engineer. To hold it when thus actuated I provide a simple friction device consisting of a pair of clamping bars 106, arranged to clasp the shaft 26, the degree of clamping action being determined by a suitable clamp bolt 107. These clamping plates are supported by a pin or lug 108 which is bolted to the plates 106 and is supported on one of the brackets 19. This friction device serves to hold the shaft in its adjusted position, and to restore it to normal after the engineer has observed the signals, I provide a pneumatic cylinder 109 whose piston rod 110 is adapted when projected to strike against an upstanding cam 111 and thus return the shaft. The rear end of this cylinder 109 is connected by a pipe 112 with the air reservoir D, a suitable manually operable valve 113 being inserted in this pipe at a point where it will be convenient for the engineer.

To support the tappet 36 in a plane just above the trip pins 25 I provide an upstanding stop 114, and to support the trip arms 20 in proper position I provide each of said arms with a leg 115. It will be understood from the foregoing that my invention is not confined to the specific construction shown and described as many of its various functions may be carried out by differently constructed devices which shall be within the spirit of the invention.

It may be desirable or necessary in order that confusion of signals shall be avoided that some means shall be provided for preventing the impact against the vehicle shoe B throwing said shoe to a point higher than it is actually raised by contact with the road bed shoe. I have shown in Fig. 23 one simple way of doing this. In front of the shoe B I mount a series of pendulum trip rods 116 arranged in a stepped-up way, the one immediately adjacent the end of the shoe depending to a point below the next rod and so on. The upper end of each rod is provided with a rearwardly extending lug 117, all these lugs being normally in the path of movement of the free end of the shoe. It will be observed that when the road bed shoe is adjusted to operate the white light, it will not come in contact with any of these rods or fingers; in this action of the shoe the shoe will be prevented from rising above the desired point by means of the lug 117 on the first one of the rods. Should however the road bed shoe be adjusted to light the green lamp, the nose of the shoe would as it approaches the vehicle shoe strike the first rod and swing it on its pivot far enough to take its head 117 forwardly out of the path of the vehicle shoe, so as to thereby permit the shoe to rise the desired height, beyond which it will be prevented from going by the head 117 on the second rod. In this way I provide a sort of graduated stop device which will be automatic in action.

Having thus described my invention, what I claim as new and desire to secure by Letters Patent, is—

1. In an apparatus of the class set forth, the combination of a railway vehicle carrying a pair of shoes, one at each side of the vehicle, each shoe being adapted to be shifted varying distances by road-bed obstacles, a set of visual signals at the front of the vehicle cab and another set of signals at the rear of the cab, means for operating each set of signals independently by the movement of either one of said shoes, and means for automatically shifting one or the other set of signals into action by the change of direction of movement of the vehicle, whereby when the vehicle is moving forwardly the front set of signals will be subject to actuation by one of the shoes and when the vehicle is moving rearwardly the other or rear set of signals will be made subject to the other shoe.

2. In an apparatus of the class set forth, the combination of a railway vehicle provided with a cab, a set of signals at the front of the cab and an independent set of signals at the rear of the cab, means for actuating each set of signals independently according to the direction of movement of the vehicle, said means embodying a series of pneumatic tubes extending to each set of signals, a fluid pressure source connected to said tubes, a shiftable valve adapted to connect either set of tubes with said source of pressure, and means for shifting this valve operated by the change in direction of rotation of one of the vehicle axles.

3. In an apparatus of the class set forth, the combination of a railway vehicle provided with a cab for the engineer, a set of signals at the front of the cab and another similar set at the rear of the cab, pneumatic mechanism for actuating the sets of signals independently of each other from obstacles on the road-bed according to the direction of movement of the vehicle, whereby when the vehicle is moving forwardly the front set of signals will be in use and when the vehicle is backing the rear set of signals will be in use, said mechanism embodying a shoe at each side of the vehicle, a valve mechanism and means for rendering said valve mechanism operable through the medium of either of said shoes according to the direction of movement of the vehicle.

4. In an apparatus of the class set forth, the combination of a road bed shoe or obstacle and means for setting it at different points, a railway vehicle carrying a shoe adapted to be shifted varying distances by the aforesaid shoe or obstacle, a series of signal devices and means on the vehicle whereby the movement of the shoe thereon will be translated into different signals, said means embodying a graduated stop means for limiting the movement of the shoe on the vehicle to prevent it moving to a greater distance than the road bed shoe or obstacle is set for.

In testimony whereof I hereunto affix my signature in the presence of two witnesses.

HIRAM G. SEDGWICK.

Witnesses:
ARBA A. JORDAN,
M. K. JORDAN.

Copies of this patent may be obtained for five cents each, by addressing the "Commissioner of Patents, Washington, D. C."